United States Patent
Watanabe

(10) Patent No.: US 12,512,504 B2
(45) Date of Patent: Dec. 30, 2025

(54) LITHIUM ION BATTERY

(71) Applicant: AESC Japan Ltd., Zama (JP)

(72) Inventor: Kenji Watanabe, Sagamihara (JP)

(73) Assignee: AESC Japan Ltd., Zama (JP)

( * ) Notice: Subject to any disclaimer, the term of this patent is extended or adjusted under 35 U.S.C. 154(b) by 301 days.

(21) Appl. No.: 16/483,586

(22) PCT Filed: Jan. 22, 2018

(86) PCT No.: PCT/JP2018/001731
§ 371 (c)(1),
(2) Date: Aug. 5, 2019

(87) PCT Pub. No.: WO2018/155035
PCT Pub. Date: Aug. 30, 2018

(65) Prior Publication Data
US 2019/0386284 A1  Dec. 19, 2019

(30) Foreign Application Priority Data

Feb. 22, 2017  (JP) .................................. 2017-031349

(51) Int. Cl.
*H01M 10/0525*  (2010.01)
*H01M 4/133*  (2010.01)
(Continued)

(52) U.S. Cl.
CPC ....... *H01M 10/0525* (2013.01); *H01M 4/133* (2013.01); *H01M 10/0565* (2013.01);
(Continued)

(58) Field of Classification Search
None
See application file for complete search history.

(56) References Cited

U.S. PATENT DOCUMENTS 9,882,193 B2 *  1/2018  Choi ................... B23K 35/286
2003/0215702 A1 *  11/2003  Tanjou ................ H01M 50/502
429/127
(Continued)

FOREIGN PATENT DOCUMENTS

CN   102522516 A   6/2012
JP   2004-071438 A   3/2004
(Continued)

OTHER PUBLICATIONS

International Search Report of PCT/JP2018/001731 dated Apr. 24, 2018.
(Continued)

*Primary Examiner* — Amanda J Barrow
(74) *Attorney, Agent, or Firm* — Sughrue Mion, PLLC

(57) ABSTRACT

Described is a lithium ion battery comprising terminals and more than one power generation element, each having current collectors. Each negative electrode current collector having an uncoated portion including an angled portion, wherein an end portion thereof and an end portion on an inner side of a negative electrode terminal are joined with each other in a negative electrode joint portion by welding. The end portion on the uncoated portion of a negative electrode current collector and end portions of the uncoated portions of the other negative electrode current collectors are overlapped and joined with each other at a negative electrode joint portion. The lithium ion battery further comprises a first non-joint portion in which a most distal end portion on the uncoated portion of each negative electrode current collector is overlapped, but not welded to each other or the negative electrode terminal. The first non-joint portion extends from a distal edge portion of the uncoated portion of each negative electrode current collector to the negative electrode joint portion in a direction opposite to a predetermined one direction and a maximum length of the first non-joint portion in the predetermined one direction is specified. Variants and alternatives are also described.

18 Claims, 5 Drawing Sheets

(51) Int. Cl.
*H01M 10/0565* (2010.01)
*H01M 10/0566* (2010.01)
*H01M 10/0585* (2010.01)
*H01M 50/489* (2021.01)
*H01M 50/434* (2021.01)
*H01M 50/443* (2021.01)
*H01M 50/451* (2021.01)
*H01M 50/531* (2021.01)
*H01M 50/548* (2021.01)
*H01M 50/553* (2021.01)
*H01M 50/557* (2021.01)
*H01M 50/566* (2021.01)

(52) U.S. Cl.
CPC ............... *H01M 10/0566* (2013.01); *H01M 10/0585* (2013.01); *H01M 50/489* (2021.01); *H01M 50/434* (2021.01); *H01M 50/443* (2021.01); *H01M 50/451* (2021.01); *H01M 50/531* (2021.01); *H01M 50/548* (2021.01); *H01M 50/553* (2021.01); *H01M 50/557* (2021.01); *H01M 50/566* (2021.01)

(56) References Cited

U.S. PATENT DOCUMENTS

| | | | | |
|---|---|---|---|---|
| 2009/0197162 A1* | 8/2009 | Shinyashiki | ........ | H01M 50/528 429/161 |
| 2011/0052971 A1* | 3/2011 | Fujikawa | .............. | H01M 4/661 429/161 |
| 2011/0206976 A1* | 8/2011 | Yoo | ........................ | H01M 50/54 429/153 |
| 2012/0077065 A1* | 3/2012 | Kamiya | .............. | H01M 50/172 429/94 |
| 2012/0244423 A1* | 9/2012 | Kusukawa | .......... | H01M 50/191 429/178 |
| 2015/0014583 A1* | 1/2015 | Kaburagi | ............... | H01M 4/485 252/184 |
| 2015/0024255 A1* | 1/2015 | Jung | ..................... | H01M 50/10 429/159 |
| 2015/0037652 A1* | 2/2015 | Kim | .................... | H01M 50/431 429/144 |
| 2016/0197335 A1* | 7/2016 | Kim | .................... | H01M 50/528 429/179 |
| 2016/0268645 A1* | 9/2016 | Koebler | ................ | H01M 50/20 |
| 2017/0033342 A1* | 2/2017 | Ueda | ..................... | H01G 11/14 |

FOREIGN PATENT DOCUMENTS

| | | | | |
|---|---|---|---|---|
| JP | 2008-060407 | * | 3/2008 | ............. H01G 9/016 |
| JP | 2009-087611 A | | 4/2009 | |
| JP | 2016-501424 A | | 1/2016 | |
| JP | 2017-212075 A | | 11/2017 | |
| WO | 2016/208238 A1 | | 12/2016 | |

OTHER PUBLICATIONS

Communication dated Aug. 25, 2020, issued by the Japanese Patent Office in application No. 2019-501125.

Communication dated Jul. 23, 2021, from the China national Intellectual Property Administration in application No. 201880011722.3.

* cited by examiner

LITHIUM ION BATTERY

CROSS REFERENCE TO RELATED APPLICATIONS

This application is a National Stage of International Application No. PCT/JP2018/001731 filed Jan. 22, 2018, claiming priority based on Japanese Patent Application No. 2017-031349 filed Feb. 22, 2017, the contents of which are incorporated herein by reference.

TECHNICAL FIELD

The present invention relates to a lithium ion battery.

BACKGROUND ART

Lithium ion batteries have characteristics of high energy density and thus are widely used as power sources of mobile phones, note type personal computers, electric cars, and the like.

In the lithium ion battery, an inflammable organic solvent is used as a main solvent of an electrolytic solution, and thus, safety against ignition or explosion is required.

A technology regarding the safety of the lithium ion battery is, for example, disclosed in Patent Document 1 (Japanese Unexamined Patent Publication No. 2004-71438).

Patent Document 1 discloses a non-aqueous secondary battery, in which an electrode body, in which a positive electrode formed by forming a positive electrode active material-containing coating on at least one surface of a positive electrode current collector and a negative electrode formed by forming a negative electrode active material-containing coating on at least one surface of a negative electrode current collector are laminated through a first separator, is accommodated in a container, a cathode electrode which is electrically connected to the positive electrode current collector and is obtained by coating at least the positive electrode active material-containing coating of an outermost layer of the laminated electrode body, and an anode electrode which is electrically connected to the negative electrode current collector and is obtained by coating at least the negative electrode active material-containing coating of the outermost layer, are laminated on the outermost layer of the laminated electrode body through a second separator, and a volume of each of the cathode electrode and the anode electrode is equal to or greater than 150 mm$^3$ per 1 AH of discharge capacity.

Patent Document 1 discloses that it is possible to sufficient prevent ignition, even in a case where internal short occurs due to nail penetration, in a case where the non-aqueous secondary battery described above has high discharge capacity equal to or greater than 5 AH.

RELATED DOCUMENT

Patent Document

[Patent Document 1] Japanese Unexamined Patent Publication No. 2004-71438

SUMMARY OF THE INVENTION

Technical Problem

Further improvement of safety of a lithium ion battery has been required in accordance with realization of a large size of the lithium ion battery or a high energy density.

The invention is made in view of such circumstances, and an object of the invention is to provide a lithium ion battery having excellent safety.

Solution to Problem

The inventors have conducted intensive studies for realizing a lithium ion battery having excellent safety. As a result, the inventors have found that a lithium ion battery having excellent safety of which the ignition hardly occurs, by providing a non-joint portion where an electrode terminal is not joined with the most distal end portion of the outer side of the electrode current collector, and the invention has completed.

The invention has been proposed based on such knowledge.

That is, according to the invention, a lithium ion battery shown below is provided.

According to the invention, there is provided a lithium ion battery, including: a battery main body which includes one or more power generation elements configured by laminating a positive electrode layer including a positive electrode active material layer and a positive electrode current collector, an electrolyte layer including a separator and an electrolytic solution, and a negative electrode layer including a negative electrode active material layer and a negative electrode current collector, in this order; an outer package in which the battery main body is sealed; a positive electrode terminal which is electrically connected to the positive electrode current collector and at least a part of which is exposed to an outside of the outer package; and a negative electrode terminal which is electrically connected to the negative electrode current collector and at least a part of which is exposed to the outside of the outer package, in which an end portion on an outer side of the negative electrode current collector and an end portion on an inner side of the negative electrode terminal are joined with each other, and a first non-joint portion which is not joined with the negative electrode terminal is included on a most distal end portion on the outer side of the negative electrode current collector.

In addition, according to the invention, there is provided an lithium ion battery including: a battery main body which includes one or more power generation elements configured by laminating a positive electrode layer including a positive electrode active material layer and a positive electrode current collector, an electrolyte layer including a separator and an electrolytic solution, and a negative electrode layer including a negative electrode active material layer and a negative electrode current collector, in this order; an outer package in which the battery main body is sealed; a positive electrode terminal which is electrically connected to the positive electrode current collector and at least a part of which is exposed to an outside of the outer package; and a negative electrode terminal which is electrically connected to the negative electrode current collector and at least apart of which is exposed to the outside of the outer package, in which an end portion on an outer side of the positive electrode current collector and an end portion on an inner side of the positive electrode terminal are joined with each other, and a third non-joint portion which is not joined with the positive electrode terminal is included on a most distal end portion on the outer side of the positive electrode current collector.

Advantageous Effects of Invention

According to the invention, it is possible to provide a lithium ion battery having excellent safety.

BRIEF DESCRIPTION OF THE DRAWINGS

The abovementioned object and other objects, characteristics, and advantages become further clear with reference to suitable embodiments which will be described later and the following accompanying drawings.

DESCRIPTION OF EMBODIMENTS

Figure 1:
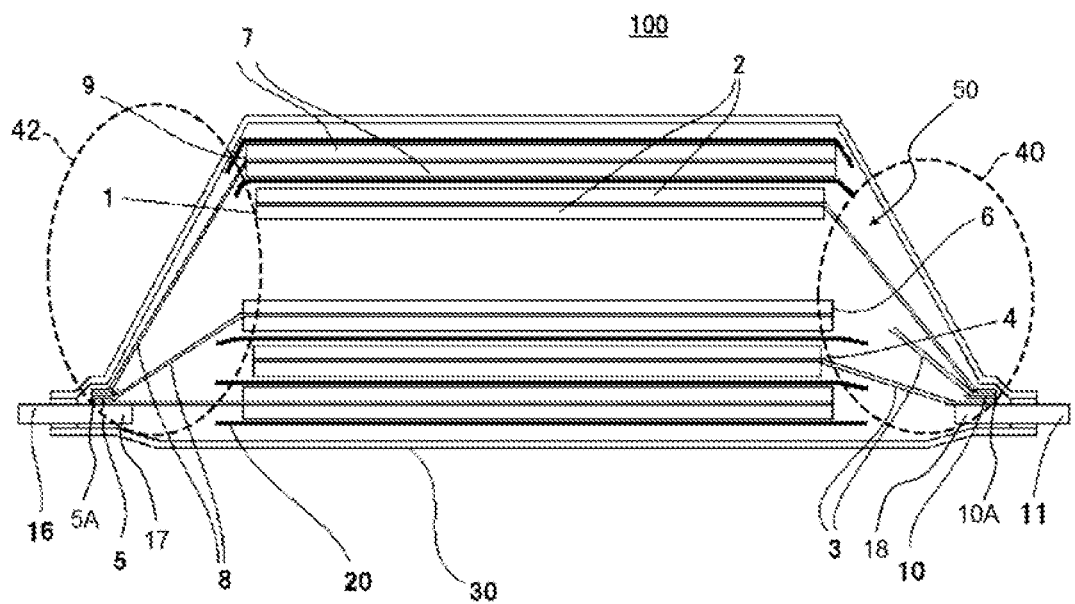
FIG. 1 is a cross-sectional view schematically showing an example of a structure of a lithium ion battery of an embodiment according to the invention.

Hereinafter, the embodiment of the invention will be described with reference to the drawings. In all drawings, the same reference numerals are used for the same constituent elements and the suitable description is not repeated. In the drawings, regarding each constituent element, a shape, a size, and a disposition relationship are schematically shown to a degree that the invention can be understood, and those may be different from the actual size. In addition, a term "to" in a case of describing the range of numerical values means equal to or greater than a value and equal to or smaller than a value, unless otherwise noted.

Figure 2:
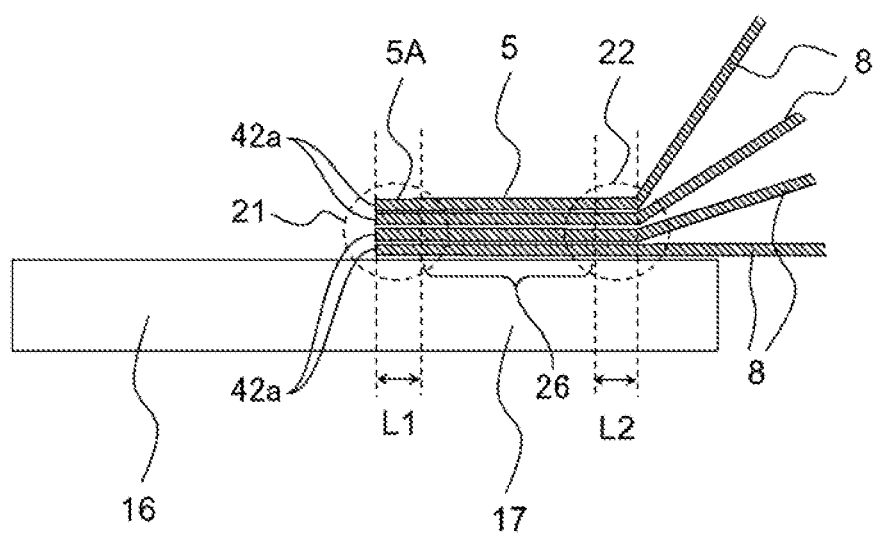
FIG. 2 is a cross-sectional view schematically showing an example of a structure of a first non-joint portion and a second non-joint portion of the lithium ion battery according to the invention.
Figure 3:
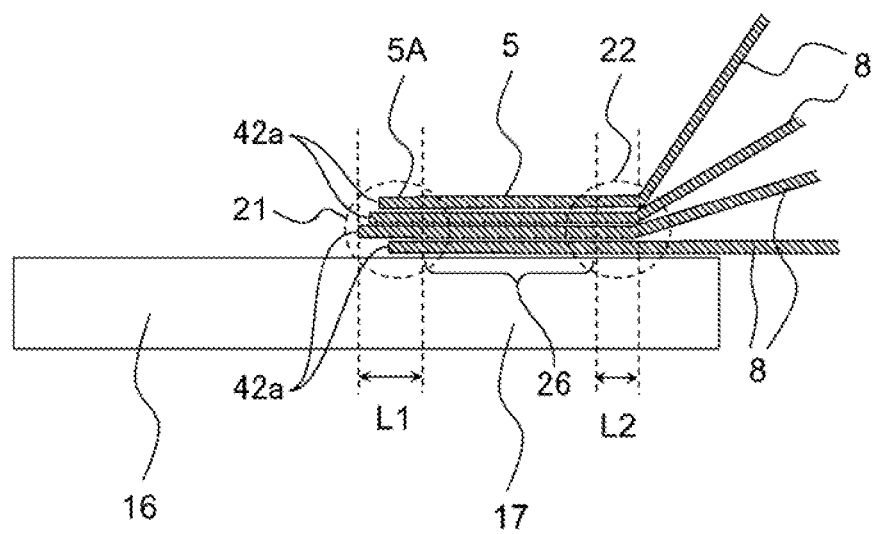
FIG. 3 is a cross-sectional view schematically showing an example of a structure of a first non-joint portion and a second non-joint portion of the lithium ion battery according to the invention.
Figure 4:
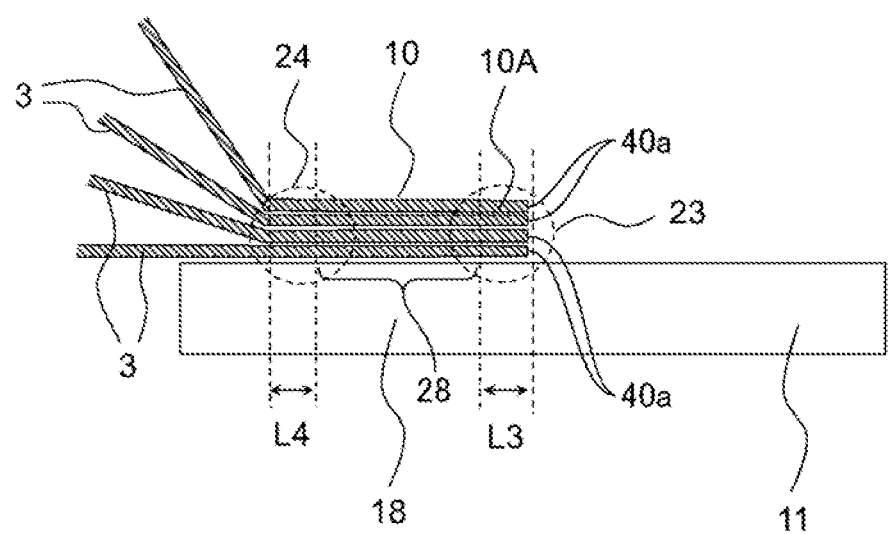
FIG. 4 is a cross-sectional view schematically showing an example of a structure of a third non-joint portion and a fourth non-joint portion of the lithium ion battery according to the invention.
Figure 5:
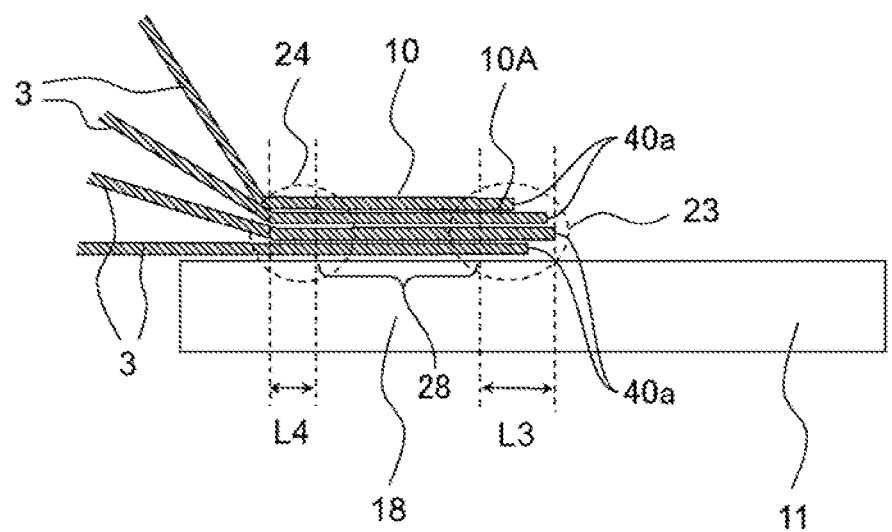
FIG. 5 is a cross-sectional view schematically showing an example of a structure of a third non-joint portion and a fourth non-joint portion of the lithium ion battery according to the invention.

FIG. 1 is a cross-sectional view schematically showing an example of a structure of a lithium ion battery 100 of an embodiment according to the invention. FIGS. 2 and 3 are cross-sectional views schematically showing an example of a structure of a first non-joint portion 21 and a second non-joint portion 22 of the lithium ion battery 100 according to the invention. FIGS. 4 and 5 are cross-sectional views schematically showing an example of a structure of a third non-joint portion 23 and a fourth non-joint portion 24 of the lithium ion battery according to the invention. The lithium ion battery 100 according to the embodiment is a lithium ion secondary battery.

As shown in FIG. 1, the lithium ion battery 100 according to the embodiment includes a battery main body 50 which includes one or more power generation elements configured by laminating a positive electrode layer 1 including a positive electrode active material layer 2 and a positive electrode current collector 3, an electrolyte layer including a separator 20 and an electrolytic solution, and a negative electrode layer 6 including a negative electrode active material layer 7 and a negative electrode current collector 8, in this order, an outer package 30 in which the battery main body 50 is sealed, a positive electrode terminal 11 which is electrically connected to the positive electrode current collector 3 and at least a part of which is exposed to the outside of the outer package 30, and a negative electrode terminal 16 which is electrically connected to the negative electrode current collector 8 and at least a part of which is exposed to the outside of the outer package 30.

At least a part of the negative electrode terminal 16 is exposed to the outside of the outer package 30 in a predetermined direction D1 perpendicular to a lamination direction D2 of the one or more power generation elements. At least a part of the positive electrode terminal 11 is exposed to the outside of the outer package 30 in a predetermined direction D3 opposite to the predetermined direction D1 and perpendicular to the lamination direction D2 of the one or more power generation elements.

As shown in FIGS. 2 and 3, in the lithium ion battery 100 according to the embodiment, an end portion 5 on the outer side of the negative electrode current collector 8 and an end portion 17 on the inner side of the negative electrode terminal 16 are joined with each other, and the lithium ion battery includes a first non-joint portion 21 which is not joined with the negative electrode terminal 16, on a most distal end portion 5A on the outer side of the negative electrode current collector 8. As shown in FIGS. 4 and 5, in the lithium ion battery 100 according to the embodiment, an end portion 10 on the outer side of the positive electrode current collector 3 and an end portion 18 on the inner side of the positive electrode terminal 11 are joined with each other, and the lithium ion battery includes a third non-joint portion 23 which is not joined with the positive electrode terminal 11, on a most distal end portion 10A on the outer side of the positive electrode current collector 3.

The first non-joint portion 21 extends from a distal edge portion 42a of the uncoated portion 42 of each negative electrode current collector 8 of the respective more than one power generation element to the negative electrode joint portion 26 in a direction D3 opposite to the predetermined one direction D1. The third non-joint portion 23 extends from a distal edge portion 40a of the uncoated portion 40 of each positive electrode current collector 3 of the respective more than one power generation element to the positive electrode joint portion 28 in the predetermined one direction D1.

The lithium ion battery 100 according to the embodiment preferably includes both the first non-joint portion 21 and the third non-joint portion 23, from viewpoint of causing the ignition more hardly occur and further increasing safety.

The inventors have conducted intensive studies for realizing a lithium ion battery having excellent safety. As a result, the inventors have found that the lithium ion battery having excellent safety of which the ignition hardly occurs, is obtained, by providing the non-joint portion which is not joined with the electrode terminal, on the most distal end portion on the outer side of the electrode current collector.

That is, according to the embodiment, it is possible to provide the lithium ion battery 100 having excellent safety of which the ignition hardly occurs, by including the first non-joint portion 21 of the negative electrode current collector 8 which is not joined with the negative electrode terminal 16 or including the third non-joint portion 23 of the positive electrode current collector 3 which is not joined with the positive electrode terminal 11.

The reason of obtaining the lithium ion battery 100 having excellent safety of which the ignition hardly occurs, by including the non-joint portion which is not joined with the electrode terminal on the most distal end portion on the outer side of the electrode current collector, is not clear, but the following reason is considered.

First, the electrode current collector and the electrode terminal are connected to each other by welding using a welding machine. Here, in a case of performing the welding so as to provide the non-joint portion described above during welding the electrode current collector and the electrode terminal on each other, it is possible to more evenly weld the joint portion between the electrode current collector and the electrode terminal, while increasing the area of the joint portion between the electrode current collector and the electrode terminal. Therefore, it is possible to reduce resistance of the joint portion between the electrode current collector and the electrode terminal and prevent heat generation of the joint portion between the electrode current collector and the electrode terminal. As a result, it is considered that, even in a case where a temperature of the battery greatly increases, a degree of the heat generation of the joint portion between the electrode current collector and the electrode terminal is reduced, and thermal runaway of the battery can be effectively prevented.

As shown in FIGS. 2 and 3, in the lithium ion battery 100 according to the embodiment, a maximum length L1 of the first non-joint portion 21 in the predetermined direction D1 is, for example, equal to or greater than 0.1 mm and equal to or less than 2.5 mm, preferably equal to or greater than 0.3 mm and equal to or less than 2.2 mm, and more preferably equal to or greater than 0.5 mm and equal to or less than 2.0 mm. In a case where the maximum length L1 is equal to or greater than the lower limit value, it is possible to more stably obtain the lithium ion battery 100 having excellent safety. In addition, in a case where the maximum length L1 is equal to or less than the upper limit value, it is possible to reduce the amount of the negative electrode current collector 8 used, and as a result, it is possible to further decrease a size or a weight of the lithium ion battery 100.

Here, as shown in FIG. 3, in a case where lengths of a plurality of the overlapped negative electrode current collectors 8 are different from each other, the maximum length L1 in the predetermined direction D1 means a length of the longest negative electrode current collector 8.

As shown in FIGS. 4 and 5, in the lithium ion battery 100 according to the embodiment, a maximum length L3 of the third non-joint portion 23 in the predetermined direction D1 is, for example, equal to or greater than 0.1 mm and equal to or less than 2.5 mm, preferably equal to or greater than 0.3 mm and equal to or less than 2.2 mm, and more preferably equal to or greater than 0.5 mm and equal to or less than 2.0 mm. In a case where the maximum length L3 is equal to or greater than the lower limit value, it is possible to more stably obtain the lithium ion battery 100 having excellent safety. In addition, in a case where the maximum length L3 is equal to or less than the upper limit value, it is possible to reduce the amount of the positive electrode current collector 3 used, and as a result, it is possible to further decrease a size or a weight of the lithium ion battery 100.

Here, as shown in FIG. 5, in a case where lengths of a plurality of the overlapped positive electrode current collectors 3 are different from each other, the maximum length L3 in the predetermined direction D1 means a length of the longest positive electrode current collector 3.

As shown in FIGS. 2 and 3, in the lithium ion battery 100 according to the embodiment, it is preferable to further include a second non-joint portion 22 which is not joined with the negative electrode current collector 8 and is different from the first non-joint portion 21, on the end portion 17 on the inner side of the negative electrode terminal 16.

By providing the second non-joint portion 22, it is possible to reduce scratches of the negative electrode current collector 8 due to a joining treatment such as welding, prevent cuts or cracks of the negative electrode current collector 8, and further improve safety of the lithium ion battery.

As shown in FIGS. 2 and 3, in the lithium ion battery 100 according to the embodiment, a maximum length L2 of the second non-joint portion 22 in the short direction is, for example, equal to or greater than 0.1 mm and equal to or less than 2.5 mm, preferably equal to or greater than 0.3 mm and equal to or less than 2.2 mm, and more preferably equal to or greater than 0.5 mm and equal to or less than 2.0 mm. In a case where the maximum length L2 is equal to or greater than the lower limit value, it is possible to more stably obtain the lithium ion battery 100 having excellent safety. In addition, in a case where the maximum length L2 is equal to or less than the upper limit value, it is possible to reduce the amount of the negative electrode current collector 8 used, and as a result, it is possible to further decrease a size or a weight of the lithium ion battery 100.

As shown in FIGS. 4 and 5, in the lithium ion battery 100 according to the embodiment, it is preferable to further include a fourth non-joint portion 24 which is not joined with the positive electrode current collector 3 and is different from the third non-joint portion 23, on the end portion 18 on the inner side of the positive electrode terminal 11.

By providing the fourth non-joint portion 24, it is possible to reduce scratches of the positive electrode current collector 3 due to a joining treatment such as welding, and prevent cuts or cracks of the positive electrode current collector 3.

As shown in FIGS. 4 and 5, in the lithium ion battery 100 according to the embodiment, a maximum length L4 of the fourth non-joint portion 24 in the short direction is, for example, equal to or greater than 0.1 mm and equal to or less than 2.5 mm, preferably equal to or greater than 0.3 mm and equal to or less than 2.2 mm, and more preferably equal to or greater than 0.5 mm and equal to or less than 2.0 mm. In a case where the maximum length L4 is equal to or greater than the lower limit value, it is possible to more stably obtain the lithium ion battery 100 having excellent safety. In addition, in a case where the maximum length L4 is equal to or less than the upper limit value, it is possible to reduce the amount of the positive electrode current collector 3 used, and as a result, it is possible to further decrease a size or a weight of the lithium ion battery 100.

In the lithium ion battery 100 according to the embodiment, in a case where the area of a negative electrode joint portion 26 between the end portion 5 on the outer side of the negative electrode current collector 8 and the end portion 17 on the inner side of the negative electrode terminal 16 is set as $S_1$ [mm$^2$], and the battery capacity of the lithium ion battery 100 is set as $C_1$ [Ah], $S_1/C_1$ is preferably equal to or greater than 3.25 and equal to or less than 8.86. In a case where the $S_1/C_1$ is equal to or greater than the lower limit value, it is possible to further reduce the resistance of the negative electrode joint portion 26 between the negative electrode current collector 8 and the negative electrode terminal 16, and further prevent the heat generation of the negative electrode joint portion 26 between the negative electrode current collector 8 and the negative electrode terminal 16. In a case where the $S_1/C_1$ is equal to or less than the upper limit value, it is possible to reduce the amount of the negative electrode current collector 8 used, and as a result, it is possible to further decrease a size or a weight of the lithium ion battery 100.

In the lithium ion battery 100 according to the embodiment, in a case where the area of a positive electrode joint portion 28 between the end portion 10 on the outer side of the positive electrode current collector 3 and the end portion 18 on the inner side of the positive electrode terminal 11 is set as $S_2$ [mm$^2$], and the battery capacity of the lithium ion battery 100 is set as $C_1$ [Ah], $S_2/C_1$ is preferably equal to or greater than 3.25 and equal to or less than 8.86. In a case where the $S_2/C_1$ is equal to or greater than the lower limit value, it is possible to further reduce the resistance of the positive electrode joint portion 28 between the positive electrode current collector 3 and the positive electrode terminal 11, and further prevent the heat generation of the positive electrode joint portion 28 between the positive electrode current collector 3 and the positive electrode terminal 11. In a case where the $S_2/C_1$ is equal to or less than the upper limit value, it is possible to reduce the amount of the positive electrode current collector 3 used, and as a result, it is possible to further decrease a size or a weight of the lithium ion battery 100.

The battery capacity (cell rated capacity) of the lithium ion battery 100 according to the embodiment is preferably equal to or greater than 5 Ah, more preferably equal to or greater than 10 Ah, even more preferably equal to or greater than 20 Ah, and particularly preferably equal to or greater than 30 Ah.

In addition, in the lithium ion battery 100 according to the embodiment, the number of laminated layers or the number of times of winding of the positive electrode layer 1 in the center part is preferably equal to or greater than 10.

Therefore, it is possible to realize high capacity of the lithium ion battery 100 according to the embodiment. Even with the high capacity described above, the lithium ion battery 100 according to the embodiment can prevent the thermal runaway of the battery.

The lithium ion battery 100 according to the embodiment can be manufactured based on a well-known method.

The shape or kind of the lithium ion battery 100 according to the embodiment is not particularly limited, and for example, the lithium ion battery can have a configuration shown below.

FIG. 1 schematically shows an example of a configuration in a case where the lithium ion battery 100 according to the embodiment is a laminated battery. The laminated battery includes the battery main body 50 including one or more power generation elements in which the positive electrode layer 1 and the negative electrode layer 6 are laminated on each other through a separator 20, and these power generation elements are accommodated in a container formed of the outer package 30 with an electrolytic solution (not shown). The positive electrode terminal 11 and the negative electrode terminal 16 are electrically connected to the power generation elements, and apart or the entire portion of each of the positive electrode terminal 11 and the negative electrode terminal 16 is drawn out of the outer package 30.

In the positive electrode layer 1, a coated portion of the positive electrode active material (positive electrode active material layer 2) and an uncoated portion 40 are respectively provided on the front and the rear of the positive electrode current collector 3, and in the negative electrode layer 6, a coated portion of the negative electrode active material (negative electrode active material layer 7) and an uncoated portion 42 are respectively provided on the front and the rear of the negative electrode current collector 8.

The uncoated portion 40 of the positive electrode active material of the positive electrode current collector 3 is set as a positive electrode tab (end portion 10 on the outer side of the positive electrode current collector 3) for the connection with the positive electrode terminal 11, and the uncoated portion 42 of the negative electrode active material of the negative electrode current collector 8 is set as a negative electrode tab (end portion 5 on the outer side of the negative electrode current collector 8) for the connection with the negative electrode terminal 16.

The positive electrode tabs are collected on the positive electrode terminal 11 and connected to each other by ultrasonic welding or the like together with the positive electrode terminal 11, and the negative electrode tabs are collected on the negative electrode terminal 16 and connected to each other by ultrasonic welding or the like together with the negative electrode terminal 16. In addition, one end of the positive electrode terminal 11 is drawn out of the outer package 30 and one end of the negative electrode terminal 16 is drawn out of the outer package 30. That is, the end portion 5 on the uncoated portion 42 of the negative electrode current collector 8 of the one of the more than one power generation elements and end portions 5 of the uncoated portions 42 of the other negative electrode current collectors 8 of the more than one power generation elements are overlapped and joined, on the inner side of the negative electrode terminal 16, with each other in respective joint portions. Likewise, the end portion 10 on the uncoated portion 40 of the positive electrode current collector 3 of the one of the more than one power generation elements and end portions 10 of the uncoated portions 40 of the other positive electrode current collectors 3 of the more than one power generation elements are overlapped and joined, on the inner side of the positive electrode terminal 11, with each other in respective joint portions.

An insulating member can be formed on a boundary portion 4 of the coated portion and the uncoated portion 40 of the positive electrode active material, if necessary, and the insulating member is not only formed on the boundary portion 4 and can also be formed in the vicinity of the boundary portion of both of the positive electrode tab and the positive electrode active material.

In the same manner, the insulating member can be formed on a boundary portion 9 of the coated portion and the uncoated portion 42 of the negative electrode active material, if necessary, and the insulating member can also be formed in the vicinity of the boundary portion of both of the negative electrode tab and the negative electrode active material.

Normally, an external dimension of the negative electrode active material layer 7 is greater than an external dimension of the positive electrode active material layer 2 and is smaller than an external dimension of the separator 20.

Next, an example of each constituent element of the lithium ion battery 100 according to the embodiment will be described.

(Positive Electrode Layer)

The positive electrode layer 1 is not particularly limited, and can be suitably selected from positive electrodes capable of being used in a well-known lithium ion battery, according to the usage or the like. The positive electrode layer 1 includes the positive electrode active material layer 2 and the positive electrode current collector 3.

As the positive electrode active material used in the positive electrode layer 1, a material having a high electron conductivity which can reversely perform emission•occlusion of lithium ions and easily perform transportation.

Examples of the positive electrode active material used in the positive electrode layer 1 include complex oxides of lithium and transition metal such as lithium nickel composite oxide, lithium cobalt composite oxide, lithium manganese composite oxide, or lithium-manganese-nickel composite oxide, transition metal sulfide such as $TiS_2$, FeS, or $MoS_2$; transition metal oxide such as MnO, $V_2O_5$, $V_6O_{13}$, or $TiO_2$, and olivine type lithium phosphorus oxide.

The olivine type lithium phosphorus oxide, for example, includes at least one kind of elements from the group consisting of Mn, Cr, Co, Cu, Ni, V, Mo, Ti, Zn, Al, Ga, Mg, B, Nb, and Fe, lithium, phosphorus, and oxygen. A part of these compounds may be partially substituted with other elements for improving properties thereof.

Among these, olivine type lithium iron phosphorus oxide, lithium cobalt composite oxide, lithium nickel composite oxide, lithium manganese composite oxide, or lithium-manganese-nickel composite oxide is preferable. These positive electrode active material has a great capacity and a great energy density, in addition to a high action potential.

The positive electrode active material may be used alone or in combination of two or more kinds thereof.

A binding agent or a conducting agent can be suitably added to the positive electrode active material. As the conducting agent, carbon black, carbon fiber, graphite, or the like can be used. In addition, as the binding agent, polyvinylidene fluoride (PVdF), polytetrafluoroethylene (PTFE), carboxymethyl cellulose, modified acrylonitrile rubber particles, or the like can be used.

The positive electrode layer 1 is not particularly limited, and can be manufactured by a well-known method. For example, a method of dispersing the positive electrode active material, the conducting agent, and the binding agent in an organic solvent to obtain a slurry, and applying and drying this slurry on the positive electrode current collector 3 can be used.

A thickness or a density of the positive electrode layer 1 is suitably determined according to the usage of the battery and thus, is not particularly limited, and can be normally set based on well-known information.

The positive electrode current collector 3 is not particularly limited, and a material generally used in the lithium ion battery can be used, and examples thereof include aluminum, stainless steel, nickel, titanium, and an alloy of these. From viewpoints of cost or availability, electrochemical stability, and the like, aluminum is preferable as the positive electrode current collector 3.

(Negative Electrode Layer)

The negative electrode layer 6 can be suitably selected from negative electrode capable of being used in a well-known lithium ion battery, according to the usage or the like.

The negative electrode layer 6 includes the negative electrode active material layer 7 and the negative electrode current collector 8.

The negative electrode active material used in the negative electrode layer 6 can be suitably set according to the usage, as long as it can be used for the negative electrode.

As the specific examples of a material usable as the negative electrode active material, a carbon material such as artificial graphite, natural graphite, amorphous carbon, diamond-like carbon, fullerene, carbon nanotube, or carbon nanohorn; a lithium metal material; an alloy-based material such as silicon or tin; an oxide-based material such as $Nb_2O_5$ or $TiO_2$; or composite of these can be used.

The negative electrode active material may be used alone or in combination of two or more kinds thereof.

A binding agent or a conducting agent can be suitably added to the negative electrode active material, in the same manner as the positive electrode active material. As the binding agent or a conducting agent, the same materials added to the positive electrode active material can be used.

As the negative electrode current collector 8, copper, stainless steel, nickel, titanium, or an alloy of these can be used, and copper is particularly preferable among these.

In addition, the negative electrode layer 6 of the embodiment can be manufactured by a well-known method. For example, a method of dispersing the negative electrode active material and the binding agent in an organic solvent to obtain a slurry, and applying and drying this slurry on the negative electrode current collector 8 can be used.

(Electrolyte Layer)

The electrolyte layer is a layer disposed so as to be interposed between the positive electrode layer 1 and the negative electrode layer 6. The electrolyte layer which includes the separator 20 and an electrolytic solution and in which a porous separator is impregnated with a non-aqueous electrolytic solution, for example, is used.

The separator 20 is not particularly limited, as long as it has a function of electrically insulating the positive electrode layer 1 and the negative electrode layer 6 from each other and transmitting lithium ions, and for example, a porous separator can be used.

As the porous separator, a porous resin film is used. Examples of the resin configuring the porous resin film include polyolefin, polyimide, polyvinylidene fluoride, and polyester. As the separator 20, a porous polyolefin film is preferable, a porous polyethylene film and a porous polypropylene film are more preferable.

A thermal shrinkage percentage of the separator 20 at 160° C. is preferably equal to or greater than 0% and less than 40%, from a viewpoint of more effectively preventing thermal runaway of the battery.

The thermal shrinkage percentage of the separator 20 at 160° C. is calculated by the following method.

First, a test piece having a size of 8 cm×8 cm is cut out from the separator 20 and this test piece is subjected to a heat treatment for 1 hour at 160° C. Next, in a case where the area of one surface of the test piece before the heat treatment is set as $A_0$ [cm²] and the area of one surface of the test piece after the heat treatment is set as $A_1$ [cm²], the thermal shrinkage percentage of the separator 20 at 160° C. is calculated by $100 \times (A_0 - A_1)/A_0$ [%].

A polypropylene-based resin configuring the porous polypropylene film is not particularly limited, and examples thereof include a propylene homopolymer and a copolymer of propylene and other olefin, and a propylene homopolymer (homopolypropylene) is preferable. The polypropylene-based resin may be used alone or in combination of two or more kinds thereof.

Examples of olefin copolymerized with propylene include ethylene, α-olefin such as 1-butene, 1-pentene, 4-methyl-1-pentene, 1-hexene, 1-octene, 1-nonene, and 1-decene.

A polyethylene-based resin configuring the porous polyethylene film is not particularly limited, and examples thereof include an ethylene homopolymer and a copolymer of ethylene and other olefin, and an ethylene homopolymer (homopolyethylene) is preferable. The polyethylene-based resin may be used alone or in combination of two or more kinds thereof.

Examples of olefin copolymerized with ethylene include α-olefin such as 1-butene, 1-pentene, 4-methyl-1-pentene, 1-hexene, 1-octene, 1-nonene, and 1-decene.

A thickness of the separator 20 is preferably equal to or greater than 5 μm and equal to or less than 50 μm and more preferably equal to or greater than 10 μm and equal to or less than 40 µm, from a viewpoint of a balance between mechanical strength and lithium ion conductivity.

The separator 20 preferably further includes a ceramic layer on at least one surface of the porous resin film, from a viewpoint of further improving heat resistance.

Since the separator 20 further includes the ceramic layer, it is possible to further reduce thermal shrinkage and further prevent short circuit between electrodes.

The ceramic layer can be formed by applying and drying a ceramic layer forming material on the porous resin layer. As the ceramic layer forming material, for example, a material obtained by dissolving and dispersing an inorganic filler and a binding agent in a suitable solvent can be used, for example.

The inorganic filler used in the ceramic layer can be suitably selected from well-known materials used in the separator of the lithium ion battery. For example, oxide, nitride, sulfide, or carbide having high insulating properties is preferable, and a material obtained by adjusting one kind or two or more kinds of inorganic compounds selected from oxide-based ceramics such as titanium oxide, alumina, silica, magnesia, zirconia, zinc oxide, iron oxide, ceria, and yttria, in a particle shape is more preferable. Among these, titanium oxide or alumina is preferable.

The binding agent is not particularly limited, and examples thereof include cellulose-based resin such as carboxymethyl cellulose (CMC); an acrylic resin; and a fluorine-based resin such as polyvinylidene fluoride (PVDF). The binding agent may be used alone or in combination of two or more kinds thereof.

The solvent for dissolving or dispersing these components is not particularly limited, and for example, water, alcohols such as ethanol, N-methyl pyrrolidone (NMP), toluene, dimethyl carbonate (DMC), or ethyl methyl carbonate (EMC) can be suitably selected and used.

A thickness of the ceramic layer is preferably equal to or greater than 1 µm and equal to or less than 20 µm and more preferably equal to or greater than 1 µm and equal to or less than 12 µm, from a viewpoint of a balance between mechanic strength, availability, and lithium ion conductivity.

The electrolytic solution according to the embodiment is obtained by dissolving the electrolyte in a solvent.

As the electrolyte, lithium salt is used and may be selected according to the kind of the active material. Examples thereof include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, LiCl, LiBr, $LiB(C_2H_5)_4$, $CF_3SO_3Li$, $CH_3SO_3Li$, $LiC_4F_9SO_3$, $Li(CF_3SO_2)_2N$, and lower fatty acid lithium carboxylate.

The solvent for dissolving the electrolyte is not particularly limited, as long as it is a solvent generally used as liquid for dissolving the electrolyte, and examples thereof include carbonates such as ethylene carbonate (EC), propylene carbonate (PC), butylene carbonate (BC), dimethyl carbonate (DMC), diethyl carbonate (DEC), methylethyl carbonate (MEC), and vinylene carbonate (VC); lactones such as γ-butyrolactone and γ-valerolactone; ethers such as trimethoxymethane, 1,2-dimethoxyethane, diethyl ether, tetrahydrofuran, and 2-methyltetrahydrofuran; sulfoxides such as dimethylsulfoxide; oxolans such as 1,3-dioxolane and 4-methyl-1,3-dioxolane; a nitrogen-containing solvent such as acetonitrile, nitromethane, formamide, or dimethylformamide; organic acid esters such as methyl formate, methyl acetate, ethyl acetate, butyl acetate, methyl propionate, ethyl propionate; phosphate triesters and diglymes; triglymes; sulfolanes such as sulfolane and methylsulfolane; oxazolidinones such as 3-methyl-2-oxazolidinone; and sultones such as 1,3-propane sultone, 1,4-butane sultone, and naphthasultone. These may be used alone or in combination of two or more kinds thereof.

(Outer Package)

As the outer package 30 according to the embodiment, a well-known member can be used, and a laminate film including a metal layer and a heat-fusion resin layer is preferably used, from a viewpoint of weight reduction of the battery. As the metal layer, a layer having barrier properties of preventing leakage of the electrolytic solution or permeation of moisture from the outside can be selected, and for example, stainless steel (SUS), aluminum, copper, or the like can be used.

The resin material configuring the heat-fusion resin layer is not particularly limited, and for example, polyethylene, polypropylene, nylon, or polyethylene terephthalate (PET) can be used.

In the embodiment, the outer package 30 can be formed by causing the heat-fusion resin layers of the laminate film to face each other through the battery main body 50 and performing heat fusion of the periphery of the portion accommodating the battery main body 50. A resin layer such as a nylon film or a polyester film can be provided on a surface of the outer package which is a surface opposite to the surface where the heat-fusion resin layer is formed.

(Electrode Terminal)

In the embodiment, a well-known member can be used for the positive electrode terminal 11 and the negative electrode terminal 16. For example, a material configured with aluminum or an aluminum alloy can be used for the positive electrode terminal 11, and for example, copper, a copper alloy, or a material obtained by performing nickel plating thereto can be used for the negative electrode terminal 16. Each terminal is drawn out of the container, and the heat-fusion resin can be provided on a portion of each terminal positioned on a portion for heat fusion of the periphery of the outer package 30, in advance.

(Insulating Member)

In a case of forming the insulating member on the boundary portions 4 and 9 of the coated portion and the uncoated portions 40 and 42 of the active material, polyimide, glass fiber, polyester, polypropylene, or a material including these in the configuration can be used. The insulating member can be formed by welding the boundary portions 4 and 9 by adding heat to these members, or applying and drying a gelatinous resin on the boundary portions 4 and 9.

Hereinabove, the embodiment of the invention has been described, but these are merely example of the invention and various other configurations can be used.

The invention is not limited to the embodiment described above, and modifications, improvements, and the like capable of achieving the object of the invention are included in the invention.

Example 1

<Manufacturing of Positive Electrode Layer>

A composite oxide including $LiMn_2O_4$ and $LiNi_{0.8}Co_{0.1}Al_{0.1}O_2$ as main components was used as the positive electrode active material, carbon black (SC65, manufactured by TIMCAL Ltd.) was used as the conducting agent, and polyvinylidene fluoride (PVdF) was used as the binding agent. These were dispersed in the organic solvent to prepare a slurry. This slurry was continuously applied and dried on an aluminum foil having a thickness of 15 µm which is the positive electrode current collector, and a positive electrode roll including a coated portion of the positive electrode current collector and an uncoated portion 40 where the coating was not performed, was manufactured.

This positive electrode roll was set as a positive electrode by causing the uncoated portion 40 to be a tab for connection to the positive electrode terminal to remain, and performing punching so that a dimension except the positive electrode tab was vertically 226.6 mm and horizontally 193.8 mm.

<Manufacturing of Negative Electrode Layer>

Artificial graphite was used as the negative electrode active material, and styrene butadiene rubber (SBR) was used as the binding agent. These were dispersed in an organic solvent to prepare a slurry. This slurry was continuously applied and dried on a copper foil having a thickness of 8 μm which is the negative electrode current collector, and a negative electrode roll including a coated portion of the negative electrode current collector and an uncoated portion 42 where the coating was not performed, was manufactured.

This negative electrode roll was set as a negative electrode by causing the uncoated portion 42 to be a tab for connection to the negative electrode terminal to remain, and performing punching so that a dimension except the negative electrode tab was vertically 230.8 mm and horizontally 197.8 mm.

<Separator>

As the separator, a porous polypropylene film having a thickness of 20 μm and a thermal shrinkage percentage of 39% at 160° C. was used.

<Manufacturing of Lithium Ion Battery>

The positive electrode layer and the negative electrode layer were laminated on each other through the separator, the negative electrode terminal or the positive electrode terminal was provided thereon, and the battery main body was obtained. Then, an electrolytic solution obtained by dissolving 1 M of $LiPF_6$ into a solvent formed of ethylene carbonate and diethyl carbonate, and the obtained battery main body was accommodated in the laminate film, and accordingly, the laminated lithium ion battery shown in FIG. 1 was obtained. The battery capacity of this lithium ion battery was 40 Ah, the positive electrode was 21 layers and the negative electrode was 22 layers.

Here, by adjusting the length of the copper foil which is the negative electrode current collector or the welding position of the negative electrode terminal and the negative electrode current collector, a first non-joint portion and a second non-joint portion were provided. In addition, the maximum lengths L1 and L2 of the first non-joint portion and the second non-joint portion, and the area $S_1$ [mm²] of the negative electrode joint portion 26 of the negative electrode current collector and the negative electrode terminal were obtained.

<Evaluation>

(1) External Short Circuit Test

In a full charge state, a lithium ion battery was short-circuited using an external resistance device having a short circuit resistance of 0.2 mΩ.

Next, safety of each lithium ion battery was evaluated based on the following criteria.

A: lithium ion battery of which fuming and ignition did not occur

B: lithium ion battery of which fuming and ignition occurred

The obtained evaluation result is shown in Table 1.

Examples 2 and 3 and Comparative Examples 1

Each lithium ion battery was manufactured in the same manner as in Example 1, except that the presence or absence of the first non-joint portion and the second non-joint portion, the maximum lengths L1 and L2 of the first non-joint portion and the second non-joint portion in the predetermined direction D1, the area $S_1$ [mm²] of the negative electrode joint portion 26 between the negative electrode current collector and the negative electrode terminal were respectively changed to values shown in Table 1, and the evaluation same as that in Example 1 was performed.

The obtained evaluation result is shown in Table 1.

TABLE 1

|  | Example 1 | Example 2 | Example 3 | Comparative Example 1 |
|---|---|---|---|---|
| presence or absence of first non-joint portion | Present | Present | Present | Absent |
| L1 [mm] | 1.8 | 1.2 | 0.50 | 0.0 |
| presence or absence of second non-joint portion | Present | Present | Present | Present |
| L2 [mm] | 1.8 | 1.2 | 0.50 | 0.90 |
| $S_1$ [mm²] | 133 | 140 | 145 | 125 |
| $S_1/C_1$ [—] | 3.33 | 3.50 | 3.63 | 3.13 |
| Safety evaluation | A | A | A | B |

From Table 1, in the lithium ion batteries of the examples each including the first non-joint portion which is not joined with the negative electrode terminal on the negative electrode current collector, the safety was excellent. With respect to this, in the lithium ion batteries of the comparative examples not including the first non-joint portion, the safety was deteriorated.

The invention claimed is:

1. A lithium ion battery comprising:
   a battery main body including more than one power generation element, each having a positive electrode layer including a positive electrode active material layer and a positive electrode current collector, an electrolyte layer including a separator and an electrolytic solution, and a negative electrode layer including a negative electrode active material layer and a negative electrode current collector, the positive electrode layer, the electrolyte layer, and the negative electrode layer being laminated in this order;
   an outer package in which the battery main body is sealed;
   a positive electrode terminal which is electrically connected to each positive electrode current collector of the more than one power generation element, at least a part of the positive electrode terminal being exposed to an outside of the outer package; and
   a negative electrode terminal which is electrically connected to each negative electrode current collector of the more than one power generation element, at least a part of the negative electrode terminal being exposed to the outside of the outer package in a predetermined one direction perpendicular to a lamination direction of the more than one power generation element,
   wherein each negative electrode current collector of the more than one power generation element has an uncoated portion in which the negative electrode active material layer is not formed, and the uncoated portion of at least one of the negative electrode current collectors of the more than one power generation element includes an angled portion angled with respect to the predetermined one direction,
   wherein an end portion on the uncoated portion of a negative electrode current collector of one of the more than one power generation element and an end portion on an inner side of the negative electrode terminal are joined with each other in a negative electrode joint portion by welding, wherein the end portion on the uncoated portion of the negative electrode current collector of the one of the more than one power generation element and end portions of the uncoated portions of the other negative electrode current collectors of the more than one power generation element are overlapped and joined with each other at the negative electrode joint portion, wherein the lithium ion battery further comprises a first non-joint portion in which a most distal end portion on the uncoated portion of each negative electrode current collector of the more than one power generation element is overlapped, but not welded to each other or the negative electrode terminal, wherein the first non-joint portion extends from a distal edge portion of the uncoated portion of each negative electrode current collector of the respective more than one power generation element to the negative electrode joint portion in a direction opposite to the predetermined one direction, and a maximum length of the first non-joint portion in the predetermined one direction is equal to or greater than 0.5 mm and equal to or less than 2.5 mm.

2. The lithium ion battery according to claim 1, wherein an area of the negative electrode joint portion is set as $S_1$ [mm$^2$], and a battery capacity of the lithium ion battery is set as $C_1$ [Ah], the ratio $S_1/C_1$ is equal to or greater than 3.25 and equal to or less than 8.86.

3. The lithium ion battery according to claim 1, further comprising:

a second non-joint portion in which the end portion on the uncoated portion of each negative electrode current collector of the more than one power generation element is overlapped but not welded to each other or the negative electrode terminal, wherein the second non-joint portion is different from the first non-joint portion, and the second non-joint portion is disposed adjacent to the negative electrode joint portion on an opposite side of the negative electrode joint portion than the first non-joint portion in the direction opposite to the predetermined one direction.

4. The lithium ion battery according to claim 3, wherein a maximum length of the second non-joint portion in the predetermined one direction is equal to or greater than 0.1 mm and equal to or less than 2.5 mm.

5. The lithium ion battery according to claim 1, wherein each positive electrode current collector of the more than one power generation element has an uncoated portion in which the positive electrode active material layer is not formed, the uncoated portion of at least one of the positive electrode current collectors is angled with respect to a direction opposite to the predetermined one direction, wherein an end portion on the uncoated portion of a positive electrode current collector of one of the more than one power generation element and an end portion on an inner side of the positive electrode terminal are joined with each other in a positive electrode joint portion by welding, wherein the end portion on the uncoated portion of the positive electrode current collector of the one of the more than one power generation element and end portions of the uncoated portions of the other positive electrode current collectors of the more than one power generation element are overlapped and joined with each other at the positive electrode joint portion, and wherein the lithium ion battery comprises a third non-joint portion in which a most distal end portion on the uncoated portion of each positive electrode current collector of the more than one power generation element is overlapped, but not welded to each other or the positive electrode terminal, and wherein the third non-joint portion extends from a distal edge portion of the uncoated portion of each positive electrode current collector of the respective more than one power generation element to the positive electrode joint portion in the predetermined one direction.

6. A lithium ion battery comprising:

a battery main body including more than one power generation element each having a positive electrode layer including a positive electrode active material layer and a positive electrode current collector, an electrolyte layer including a separator and an electrolytic solution, and a negative electrode layer including a negative electrode active material layer and a negative electrode current collector, the positive electrode layer, the electrolyte layer, and the negative electrode layer being laminated in this order;

an outer package in which the battery main body is sealed;

a positive electrode terminal which is electrically connected to each positive electrode current collector of the more than one power generation element, at least a part of the positive electrode terminal being is exposed to an outside of the outer package; and a negative electrode terminal which is electrically connected to each negative electrode current collector of the more than one power generation element, at least a part of the negative electrode terminal being exposed to the outside of the outer package in a predetermined one direction perpendicular to a lamination direction of the more than one power generation element, wherein each positive electrode current collector of the more than one power generation element has an uncoated portion in which the positive electrode active material layer is not formed, and the uncoated portion of at least one of the positive electrode current collectors of the more than one power generation element includes an angled portion angled with respect to a direction opposite to the predetermined one direction, wherein an end portion on the uncoated portion of a positive electrode current collector of one of the more than one power generation element and an end portion on an inner side of the positive electrode terminal are joined with each other in a positive electrode joint portion by welding, wherein the end portion on the uncoated portion of the positive electrode current collector of the one of the more than one power generation element and end portions of the uncoated portions of the other positive electrode current collectors of the more than one power generation element are overlapped and joined with each other at the positive electrode joint portion, wherein the lithium ion battery further comprises a third non-joint portion in which a most distal end portion on the uncoated portion of each positive electrode current collector of the more than one power generation element is overlapped, but not welded to each other or the positive electrode terminal, wherein the third non-joint portion extends from a distal edge portion of the uncoated portion of each positive electrode current collector of the respective more than one power generation element to the positive electrode joint portion in the predetermined one direction, and a maximum length of the third non-joint portion in the predetermined one direction is equal to or greater than 0.5 mm and equal to or less than 2.5 mm.

7. The lithium ion battery according to claim 5, wherein an area of the positive electrode joint portion is set as $S_2$ [mm$^2$], and a battery capacity of the lithium ion battery is set as $C_1$ [Ah], the ratio $S_2/C_1$ is equal to or greater than 3.25 and equal to or less than 8.86.

8. The lithium ion battery according to claim 5, further comprising:
    a fourth non-joint portion, in which the end portion on the uncoated portion of each positive electrode current collector of the more than one power generation element is overlapped but not welded to each other or the positive electrode terminal,
    wherein the fourth non-joint portion is different from the third non-joint portion, and the fourth non-joint portion is disposed adjacent to the positive electrode joint portion on an opposite side of the positive electrode joint portion than the third non-joint portion in the predetermined one direction.

9. The lithium ion battery according to claim 8, wherein a maximum length of the fourth non-joint portion in the direction opposite to the predetermined one direction is equal to or greater than 0.1 mm and equal to or less than 2.5 mm.

10. The lithium ion battery according to claim 1, wherein a thermal shrinkage percentage of the separator of each of the more than one power generation element at 160° C. is equal to or greater than 0% and less than 40%.

11. The lithium ion battery according to claim 1, wherein a battery capacity of the lithium ion battery is equal to or greater than 5 Ah.

12. The lithium ion battery according to claim 6, wherein an area of the positive electrode joint portion is set as $S_2$ [mm$^2$], and a battery capacity of the lithium ion battery is set as $C_1$ [Ah], the ratio $S_2/C_1$ is equal to or greater than 3.25 and equal to or less than 8.86.

13. The lithium ion battery according to claim 6, further comprising:
    a fourth non-joint portion in which the end portions on the uncoated portion of each positive electrode current collector of the more than one power generation element is overlapped but not welded to each other or the positive electrode terminal,
    wherein the fourth non-joint portion is different from the third non-joint portion, and the fourth non-joint portion is disposed adjacent to the positive electrode joint portion on an opposite side of the positive electrode joint portion than the third non-joint portion in the predetermined one direction.

14. The lithium ion battery according to claim 13, wherein a maximum length of the fourth non-joint portion in the direction opposite to the predetermined one direction is equal to or greater than 0.1 mm and equal to or less than 2.5 mm.

15. The lithium ion battery according to claim 6, wherein a thermal shrinkage percentage of the separator of each of the more than one power generation element at 160° C. is equal to or greater than 0% and less than 40%.

16. The lithium ion battery according to claim 6, wherein a battery capacity of the lithium ion battery is equal to or greater than 5 Ah.

17. The lithium ion battery according to claim 1, wherein the maximum length of the first non-joint portion is equal to a maximum length of a longest one of the negative electrode current collectors of the more than one power generation element in the first non-joint portion.

18. The lithium ion battery according to claim 6, wherein the maximum length of the third non-joint portion is equal to a maximum length of a longest one of the positive electrode current collectors of the more than one power generation element in the third non-joint portion.

* * * * *